United States Patent [19]
Suzuki et al.

[11] Patent Number: 5,303,876
[45] Date of Patent: Apr. 19, 1994

[54] MAGNETIC TAPE CASSETTE

[75] Inventors: Hiroki Suzuki; Takateru Sato, both of Saku; Haruo Shiba, Komoro, all of Japan

[73] Assignee: TDK Corporation, Tokyo, Japan

[21] Appl. No.: 929,020

[22] Filed: Aug. 13, 1992

[30] Foreign Application Priority Data

Aug. 20, 1991 [JP] Japan .................. 3-73002[U]
Sep. 4, 1991 [JP] Japan .................. 3-78723[U]

[51] Int. Cl.[5] .................. G11B 23/087
[52] U.S. Cl. .................. 242/199
[58] Field of Search .......... 242/188, 192, 197, 199, 242/186, 189; 360/132

[56] References Cited

U.S. PATENT DOCUMENTS

| | | | |
|---|---|---|---|
| 4,405,096 | 9/1983 | Pössl | 242/199 |
| 4,458,857 | 7/1984 | Moore et al. | 242/197 |
| 4,466,584 | 8/1984 | Chevalier et al. | 242/199 |
| 4,615,682 | 10/1986 | Salvo | 242/197 X |
| 4,660,784 | 4/1987 | Sumida et al. | 360/132 X |
| 4,763,784 | 8/1988 | Newell | 242/199 X |
| 4,802,048 | 1/1989 | Perkins et al. | 242/199 X |

FOREIGN PATENT DOCUMENTS 4-11273 3/1992 Japan .
4-31482 3/1992 Japan .

Primary Examiner—Daniel P. Stodola
Assistant Examiner—John P. Darling
Attorney, Agent, or Firm—Oblon, Spivak, McClelland, Maier & Neustadt

[57] ABSTRACT

A magnetic tape cassette comprises a cassette casing, a pair of reels, on which a magnetic tape is wound, which are received in the cassette casing in a rotatable manner, and an interlocking plate for stopping the feeding of the magnetic tape, mounted on either one of said pair of reels, which is provided with an adjusting button and a control pin, wherein the interlocking plate and the adjusting button are formed integrally of a flexible material.

13 Claims, 5 Drawing Sheets

MAGNETIC TAPE CASSETTE

BACKGROUND OF THE INVENTION

1. Field of the Invention

The present invention relates to a magnetic tape cassette in which an interlocking plate is provided to adjust a recording time or a reproducing time for a magnetic tape such as an audio tape wound around a pair of reels rotatably held in the tape cassette.

2. Discussion of Background

There is proposed a magnetic tape cassette capable of adjusting a recording/reproducing time by itself (Japanese Utility Model Application No. 72496/1990 published on Mar. 13, 1992). Namely, an interlocking plate provided with an adjusting button and a magnetic tape control pin is loosely fitted to a concave portion in a winding reel for a magnetic tape, so that the winding reel and the interlocking plate are caused to rotate in one piece or relatively by engaging the adjusting button with a connecting projection formed in the concave portion or by separating the adjusting button from the connecting projection, whereby the feeding operation of the magnetic tape is stopped at a predetermined position.

A conventional structure to stop the feeding operation of the tape at a predetermined position in the longitudinal direction of the tape wherein the adjusting button is attached to the interlocking plate through a spring had the following disadvantages. Assembling work for assembling the interlocking plate, the spring and the adjusting button was troublesome; assembling operations in an automatic assembling line for a large scale production was difficult; the production and finishing these parts were complex and manufacturing costs were increased; the cost performance was inferior because there are a number of structural elements, and efficiency of production could not be improved.

SUMMARY OF THE INVENTION

It is an object of the present invention to eliminate the disadvantages of the conventional magnetic tape cassette capable of adjusting a recording/reproducing time by itself, and to provide such a magnetic tape cassette that allows assembling work in an automatic assembling line easy, improves substantially efficiency of production, reduces the number of structural elements to thereby decrease manufacturing cost, and has a simple structure.

The foregoing and other objects of the present invention have been attained by providing a magnetic tape cassette which comprises:

a cassette casing, a pair of reels, on which a magnetic tape is wound, which are received in the cassette casing in a rotatable manner, and an interlocking plate for stopping the feeding of the magnetic tape, mounted on either one of said pair of reels, which is provided with an adjusting button and a control pin, wherein the interlocking plate and the adjusting button are formed integrally of a flexible material.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 5 is an enlarged front view of a reel in an operating state of the magnetic tape of the present invention wherein

FIG. 7 is an enlarged cross-sectional view taken along a line C—C in FIG. 6, wherein FIG. 7A shows a state that the interlocking plate is engaged with an upper half casing, and FIG. 7B shows a state that the interlocking plate is engaged with a supply reel;

FIG. 9 is an enlarged cross-sectional view partly omitted, wherein FIG. 9A shows a state that the interlocking plate is engaged with the upper half casing, and FIG. 9B shows a state that the interlocking plate is engaged with the supply reel.

DETAILED DESCRIPTION OF PREFERRED EMBODIMENTS

Figure 1:
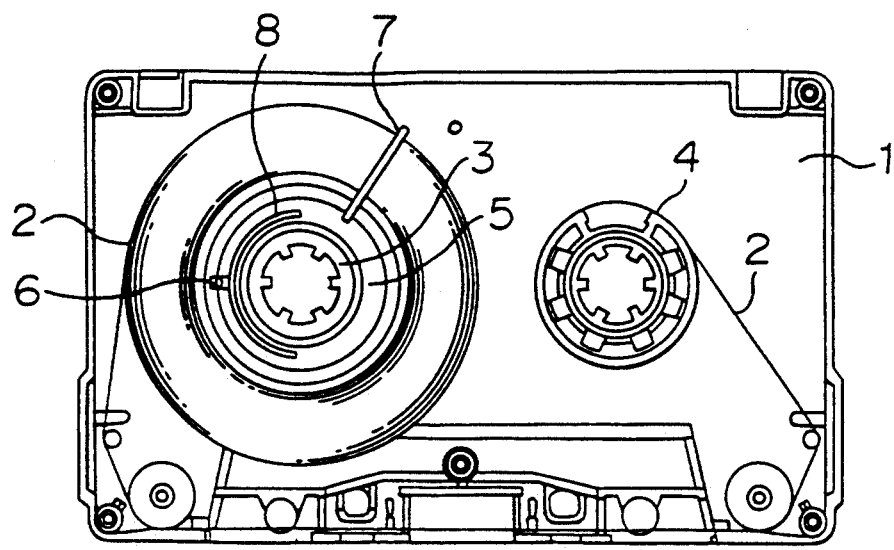
FIG. 1 is a front view of an embodiment of the magnetic tape cassette according to the present invention wherein the upper half casing is removed.

Referring to the drawings wherein the same reference numerals designate the same or corresponding parts throughout several views, and more particularly to FIGS. 1 through 6, there is shown an embodiment of the magnetic tape cassette of the present invention.

The magnetic tape cassette of the present invention comprises a cassette casing 1 consisting of upper and lower half portions, a pair of reels 3, 4 received therein a rotatable manner and a magnetic tape 2. Although the reels 3, 4 can be either a supply side or a winding side depending on the direction of running of the magnetic tape 2, the reel 3 is called a supply reel and the reel 4 is called as a winding reel in this specification. On the supply and winding reels 3, 4, the magnetic tape 2 having a predetermined length is wound with both ends of the tape 2 being fixed to respective reels.

The supply reel 3 is provided with projections formed integrally therewith which extend inwardly in the radial direction from the inner circumference, so as to receive a rotating force from a driving unit. The supply reel 3 is further provided with an annular cavity 13 at the inner side of a winding drum. A plurality of engaging projections 15 are formed at the inner wall of the annular cavity 13 at existent and extending inwardly in the radial direction, one of the engaging projections 15 being a magnetic tape end fixing part.

An annular interlocking plate 5 is loosely fitted in the annular cavity 13 of the supply reel 3.

The interlocking plate 5 is made of a synthetic resinous material and has a generally doughnut-like or annular shape comprising a cylindrical wall portion 5a, a first annular flange portion 5b formed at the upper edge of the cylindrical wall portion 5a to extend laterally and outwardly and a second flange portion 5c formed at the lower end of the cylindrical wall portion 5a so as to extend laterally and inwardly. A control pin 7 is attached to the outer circumferential portion of the upper surface of the first annular flange portion 5b, and an adjusting button 6 is formed integrally or mounted on the outer circumferential portion of the first flange portion 5b at a position diametrically opposite to the control pin 7 through a supporting portion 6a. In a case that the adjusting button 6 is formed integrally with the supporting portion 6a, they are formed of the same flexible material as that of the interlocking plate 5.

The adjusting button 6 has a projection 6b having a smooth surface at its top so that the area of contact to the inner surface is small and a smooth sliding movement is obtainable when the adjusting button 6 is pressed downwardly and becomes in contact with the inner surface of the upper half casing. Further, a cam surface 6c is formed at the bottom portion of the adjusting button 6 so that the cam surface 6c can be in contact with any of the projections 15 in the cavity 13. For the adjusting button 6 projecting from the upper surface of the interlocking plate 5 via the elastic supporting portion 6a, the adjusting button 6 has a first portion extending upwardly from the upper surface of the first annular flange portion 5b of the interlocking plate and a second portion extending laterally in the radial direction from the top end of the first portion so tat'the adjusting button 6 has a spring function.

A circular-arc shaped cut groove 8 is formed in the first flange portion 5b along the outer circumferential portion of it at a portion near the adjusting button 6. Such arrangement of the cut groove 8 further increases flexibility in the function of the adjusting button 6.

The control pin 7 is generally in a channel-shape, and one end of which is turnably supported by a hole which is formed in the first flange portion 5b in parallel to the axial line of the supply reel 3 and the other end which extends downwardly and in parallel to the axial line of the supply reel 3. Accordingly, the control pin is capable of turning around the axial hole in the first flange portion 5b so that the other end is brought to contact with a surface of the magnetic tape 2.

The interlocking plate 5 having an annular shape is loosely fitted to the annular cavity 13 of the supply reel 3, i.e. the inner wall of the cylindrical wall portion 5a of the interlocking plate is loosely fitted to the outer surface of the inner cylindrical wall of the supply reel 3. A ring pin 16 is attached to the outer surface of the inner cylindrical wall of the supply reel 3 to thereby restrict the movement of the interlocking plate in the vertical direction and to assure a stable rotation of the interlocking plate 5.

When the adjusting button 6 is a first position, namely, the adjusting button 6 enters in an opening 14 formed in the upper half casing, the interlocking plate 5 does not engage with any of the projections 15 formed in the supply reel 3 and is freely rotatable around the axis of rotation of the supply reel 3. When the adjusting button 6 is forcibly pushed downwardly to take a second position, namely, the adjusting button 6 comes in contact with the inner surface of the upper half casing, the cam surface 6c formed at the bottom of the adjusting button 6 engages with one of the projections 15 formed in the supply reel 3, whereby the relative rotation of the interlocking plate 5 and the supply reel 3 is prevented.

When the adjusting button 6 is pressed to bring it on the inner surface of the upper half casing, the opening 14 of the upper half casing is closed by a slide shutter 14a so that there is no trouble of the rotation of the interlocking plate 5. When the adjusting button 6 is in the first position, i.e. in the opening 14, the magnetic tape 2 is capable of reciprocally running between the supply reel 3 and winding reel 4.

Figure 5A:
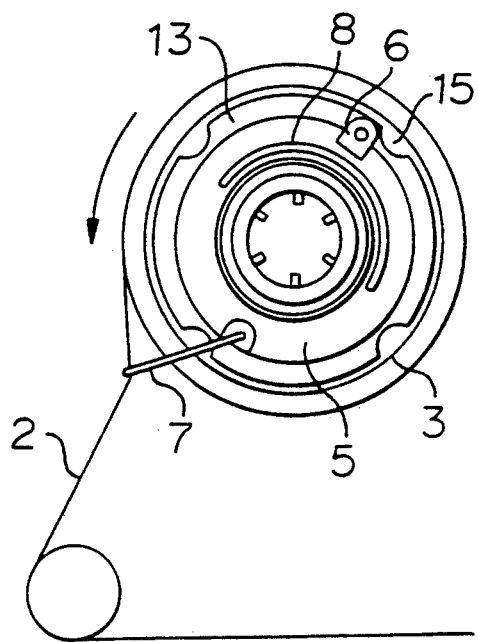
FIG. 5A shows a state that a control pin is engaged with a magnetic tape.

For instance, when a reproducing operation is to be repeated within a specified range in the entire length of a recorded magnetic tape 2, a tape length adjusting device is operated at the last position to be reproduced in a magnetic tape. First, a tape cassette is loaded on a magnetic tape recording device, and a reproducing operation is started. The magnetic tape running operation is stopped at the time point corresponding to the last portion of the magnetic tape to be reproduced. The tape cassette is removed from the magnetic tape recording device. The opening 14 is closed by operating the slide shutter 14a to press down the adjusting button 6 to move it in the second position. Then, the tape cassette is again loaded on the magnetic tape recording device. The magnetic tape recording device is operated to move in a reproducing mode or a rapid feeding mode in the same direction as just before the removal of the magnetic tape cassette. By receiving a rotating force from the tape recording device, the supply reel 3 is started to rotate in the counter clockwise direction. However, one of the projections 15 of the supply reel 3, which is near the adjusting button 6, becomes in engagement with the cam surface 6c of the adjusting button 6, and the supply reel 3 and the interlocking plate 5 are rotated together. Then, a tension on the magnetic tape 2 by the control pin is increased, whereby the movement of the magnetic tape is stopped (FIG. 5A).

Figure 5B:
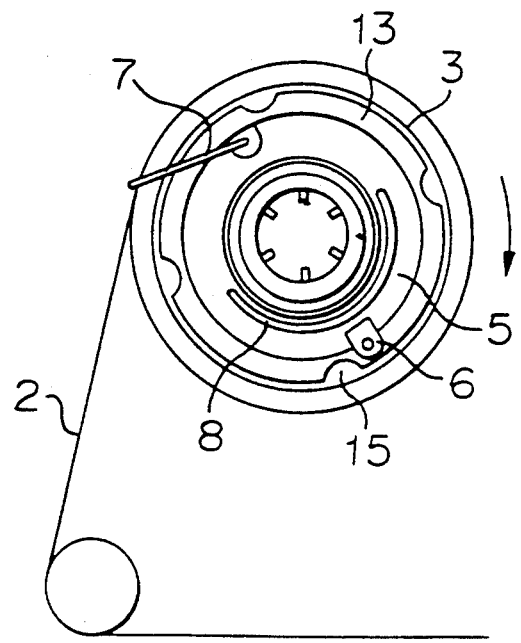
FIG. 5B shows a state that the magnetic tape is wound with the control pin being in contact with the tape.
Figure 6:
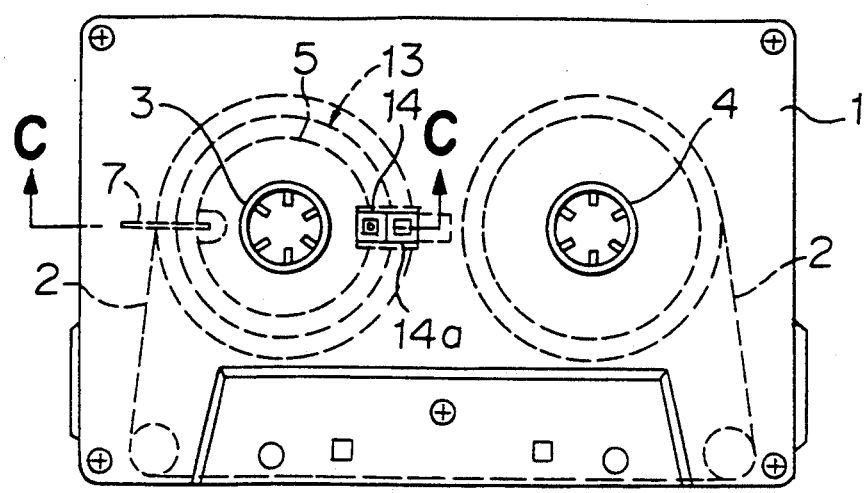
FIG. 6 is a front view of the magnetic tape cassette of the present invention.
Figure 7:
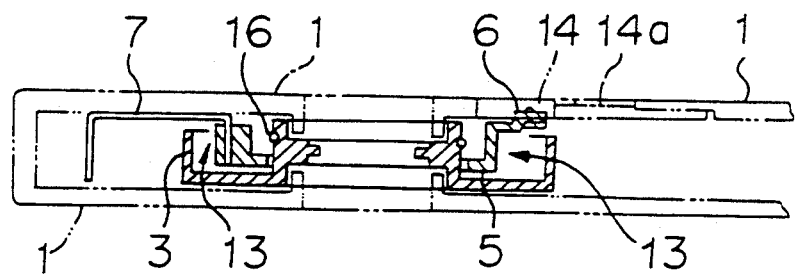
Figure 7:
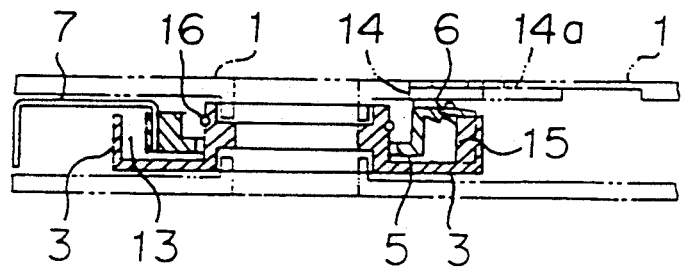

Under such condition, when the magnetic tape is wound in the direction from the winding reel 4 to the supply reel 3, the supply reel 3 and the interlocking plate 5 are rotated together in the clockwise direction because the adjusting button 6 is in a depressed position, i.e. at the second position. When the supply reel 3 is rewound by substantially one revolution, the free end portion of the control pin 7 comes in contact with the inner surface of the magnetic tape 2 at a portion extending in the tangential direction. When the supply reel 3 is further rotated together with the interlocking plate 5, the control pin 7 is rotated in the counter clockwise direction around the axial hole, and the free end of the control pin 7 is interposed between the bent magnetic tape 2 (FIG. 5B). Then, the magnetic tape 2 is continued to be wound around the supply reed in the state that the free end of the control pin 7 is interposed between the bent magnetic tape 2.

When the rewound magnetic tape 2 is caused to run by a reproducing mode or a rapid feeding mode from the supply reed 3 to the winding reel 4, the free end of the control pin 7 appears on the magnetic tape 3 just before the position set by the contacting pin at which the reproducing operation is stopped at the set position, the contacting pin 7 engages with the magnetic tape at the portion extending in the tangential direction, whereby a tension on the magnetic tape is increased in the same manner described before, and the running of the magnetic tape is again stopped.

When the position to be stopped, which has been previously set, is to be changed or canceled, the magnetic tape cassette in the stopped state at the stop posi7 tion is removed from the magnetic tape recording device, and the slide shutter 14a is moved to open the opening 14. Then, the supply reel 3 is rotated a little to expose the adjusting button 6 at the opening 14 of the upper half casing, whereby the adjusting button 6 enters in the opening 14, which is the first position.

In accordance with the embodiment of the present invention, the adjusting button is formed integrally with the interlocking plate by using a flexible material, and accordingly, a magnetic tape cassette capable of adjusting a recording/reproducing time which is applicable to an automatic assembling line for a large scale production, improving substantially processability, and reducing the number of structural elements to thereby reduce manufacturing cost, can be provided.

Figure 8:
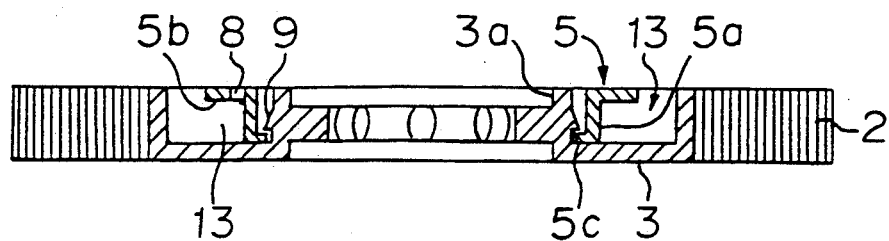
FIG. 8 is an enlarged cross-sectional view of another embodiment of the magnetic tape cassette of the present invention.
Figure 9:
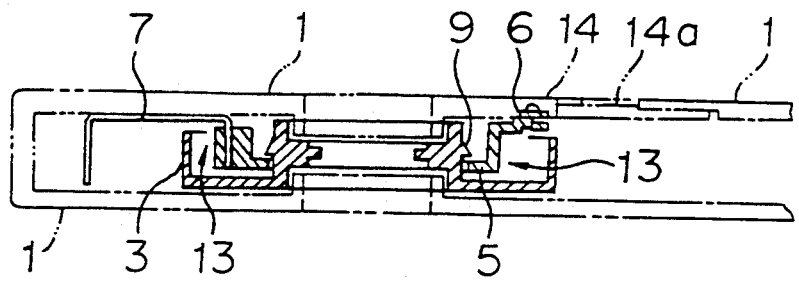
Figure 9:
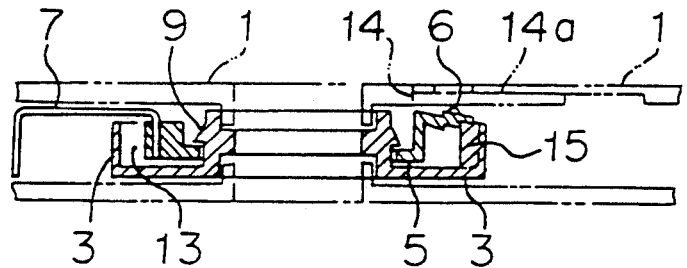
Figure 1:
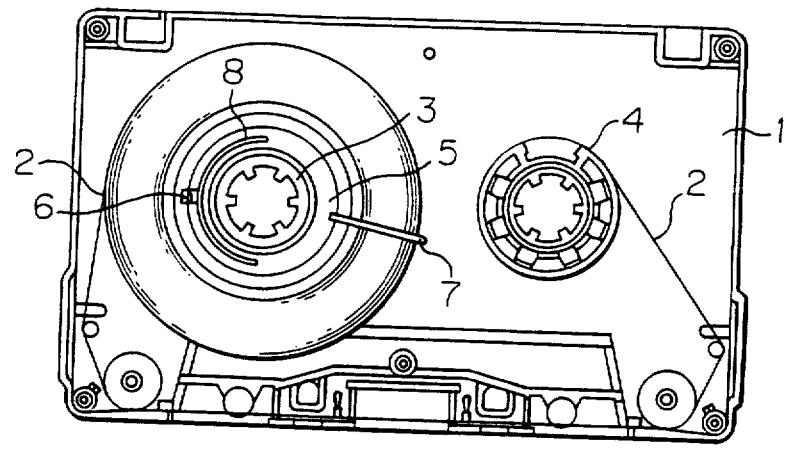
Figure 2:
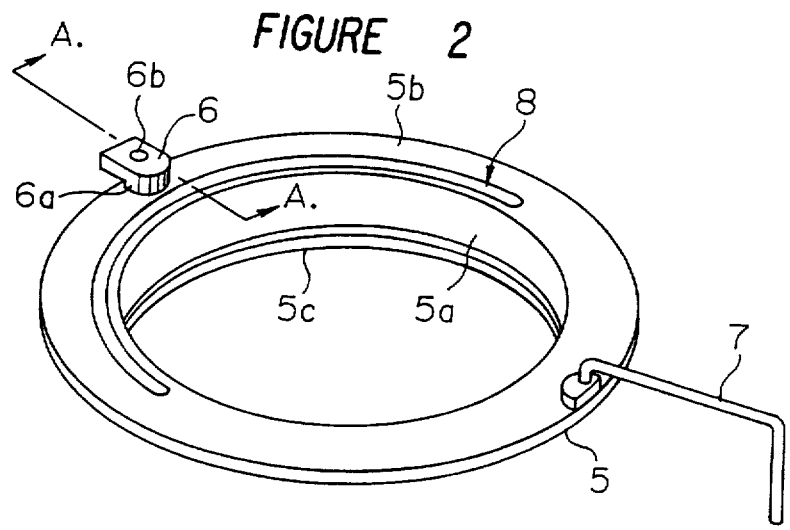

In the following, another embodiment of the present invention will be described with reference to FIGS. 8 and 9. In FIGS. 8 and 9, the same reference numerals as in FIGS. 1 through 7 designate the same or corresponding parts, and accordingly, description of these parts is omitted.

An annular-shaped interlocking plate 5 is rotatable in a cavity 13 formed in a supply reel 3 by means of an engaging portion 9. The engaging portion 9 is a plurality of undercut pawls which are formed, preferably at equidistance, on the outer circumference of the inner drum portion 3a of the supply reel 3. The undercut pawls 9 are to retain an annular flange portion 5c formed at the lower portion of a cylindrical wall 5a of the interlocking plate 5 to thereby provide a structure which allows the interlocking plate 5 to rotate in the cavity 13 while the interlocking plate is prevented from coming off from the cavity 13.

The annular interlocking plate 5 is loosely fitted to the inner cylindrical portion 3a of the supply reel 3, and the undercut pawls 9 limit the movement of the interlocking plate in the vertical direction while they allow the interlocking plate to freely rotate.

The second embodiment of the present invention has an advantage as follows. As described above, the interlocking plate is loosely fitted to the cavity formed in the supply reel. If there is no restriction on the movement of the interlocking plate in the cavity in the vertical direction, there may cause a shift of the control pin fixed to the interlocking plate in the vertical direction, whereby there is a friction between the control pin and the magnetic tape so that the magnetic tape may be damaged. The second embodiment is to prevent the magnetic tape from damage.

The second embodiment provides the same effect as the first embodiment.

Obviously, numerous modifications and variations of the present invention are possible in light of the above teachings. It is therefore to be understood that within the scope of the appended claims, the invention may be practiced otherwise than as specifically described herein.

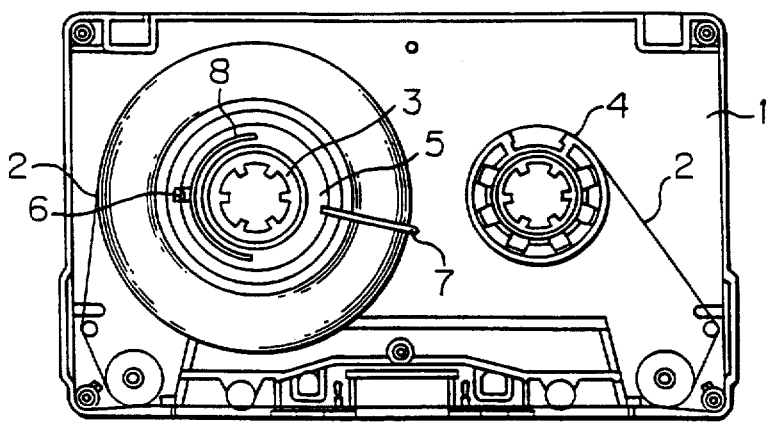

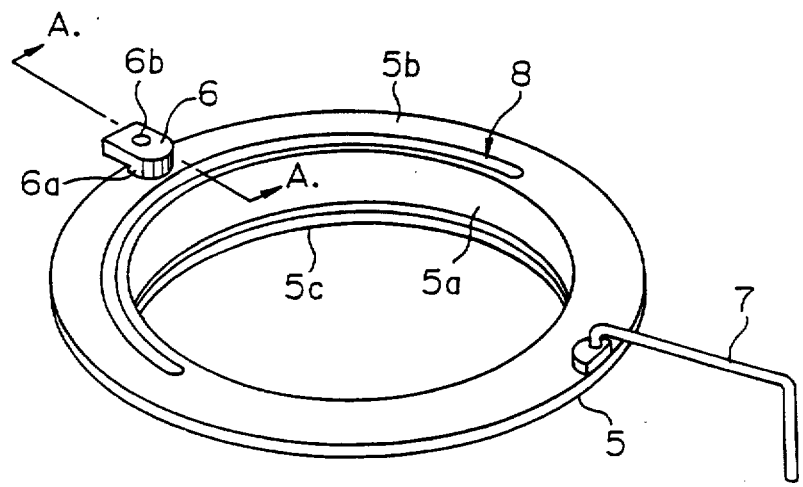

What is claimed is:

1. A magnetic tape cassette which comprises:
   a cassette casing;
   a pair of reels, on which a magnetic tape is wound, which are received in the cassette casing in a rotatable manner; and
   an interlocking plate mounted on either one of said reels, which is provided with an adjusting button and a control pin, wherein said adjusting button is directly interconnected with and immediately adjacent to the interlocking plate without any spacing between the adjusting button and interlocking plate, and wherein the interlocking plate and the adjusting button are formed of a flexible material.

2. The magnetic tape cassette according to claim 1, wherein the interlocking plate is generally in an annular shape made of a synthetic resinous material, and the adjusting button is formed integrally with the annular interlocking plate at an upper surface of a resilient supporting portion which extends from an upper portion of the interlocking plate, so as to provide an engaging projection extending from a top surface of said interlocking plate.

3. The magnetic tape cassette according to claim 1, wherein an engaging means is formed in the reel to receive the interlocking plate.

4. A magnetic tape cassette which comprises:
   a cassette casing;
   a pair of reels, on which a magnetic tape is wound, which are received in the cassette casing in a rotatable manner;
   an interlocking plate mounted on either one of said reels, which is provided with an adjusting button and a control pin, wherein said adjusting button is interconnected with the interlocking plate and wherein the interlocking plate and the adjusting button are formed of a flexible material;
   wherein the interlocking plate is generally in an annular shape made of a synthetic resinous material, and the adjusting button is formed integrally with the annular interlocking plate at an upper surface of a resilient supporting portion which extends from an upper portion of the interlocking plate, so as to provide an engaging projection extending from a top surface of said interlocking plate; and
   wherein the adjusting button comprises a first portion extending upwardly from the upper surface of the resilient supporting portion, said upper surface formed on an annular flange portion which is connected to an upper edge of a cylindrical wall of the interlocking plate, and a second portion extending in a radially outward direction from a top of the first portion.

5. A magnetic tape cassette which comprises:
   a cassette casing;
   a pair of reels, on which a magnetic tape is wound, which are received in the cassette casing in a rotatable manner;
   an interlocking plate mounted on either one of said reels, which is provided with an adjusting button and a control pin, wherein said adjusting button is interconnected with the interlocking plate and wherein the interlocking plate and the adjusting button are formed of a flexible material;
   wherein the interlocking plate is generally in an annular shape made of a synthetic resinous material, and the adjusting button is formed integrally with the annular interlocking plate at an upper surface of a resilient supporting portion which extends from an upper portion of the interlocking plate, so as to provide an engaging projection extending from a top surface of said interlocking plate; and
   wherein the interlocking plate is provided with an arc-shaped cut groove in a first annular flange portion.

6. A magnetic tape cassette which comprises:
   a cassette casing;
   a pair of reels, on which a magnetic tape is wound, which are received in the cassette casing in a rotatable manner;

an interlocking plate mounted on either one of said reels, which is provided with an adjusting button and a control pin, wherein said adjusting button is interconnected with the interlocking plate and wherein the interlocking plate and the adjusting button are formed of a flexible material; and wherein an engaging means is formed in the reel to receive the interlocking plate, and wherein the engaging means is an undercut pawl formed at an outer surface of a cylindrical wall of the reel to receive the interlocking plate, and the undercut pawl engages with an annular flange portion formed at a lower edge of the interlocking plate.

7. A magnetic tape cassette which comprises:

a cassette casing;

a pair of reels, on which a magnetic tape is wound, which are received in the cassette casing in a rotatable manner;

an interlocking plate mounted on either one of said reels, which is provided with an adjusting button and a control pin, wherein said adjusting button is interconnected with the interlocking plate and wherein the interlocking plate and the adjusting button are formed of a flexible material; and wherein an engaging means is formed in the reel to receive the interlocking plate, and wherein the interlocking plate is made of a synthetic resinous material and comprises a first annular portion projecting radially outwardly from an upper edge of a cylindrical wall and a second flange portion projecting inwardly from a lower edge thereof.

8. A magnetic tape cassette which comprises:

a cassette casing;

a pair of reels, on which a magnetic tape is wound, which are received in the cassette casing in a rotatable manner;

an interlocking plate mounted on either one of said reels, which is provided with an adjusting button and a control pin, wherein said adjusting button is interconnected with the interlocking plate and wherein the interlocking plate and the adjusting button are formed of a flexible material; and wherein said adjusting button is interconnected to said interlocking plate at a first location and said adjusting button is not relatively movable with respect to said interlocking plate at said first location.

9. The magnetic tape cassette of claim 8, wherein said adjusting button is integrally formed with said interlocking plate.

10. A magnetic tape cassette comprising:

a cassette casing;

a pair of reels, on which a magnetic tape is wound, which are received in the cassette in a rotatable manner; and an interlocking plate mounted upon one of said reels, said interlocking plate including a cylindrical wall portion and a flange extending radially outwardly from said cylindrical wall, and wherein an adjusting button is mounted upon said radially outwardly extending flange.

11. The magnetic tape cassette of claim 10, wherein said radially outwardly extending flange and said adjusting button are formed of a flexible material.

12. The magnetic tape cassette of claim 10, wherein said radially outwardly extending flange is of an annular shape extending from said cylindrical wall portion, and wherein a groove is cut in said radially outwardly extending annular flange at a location such that said groove is between said cylindrical wall portion and said adjusting button.

13. The magnetic tape cassette of claim 10, wherein said adjusting button is interconnected to said radially outwardly extending flange at a first location and said adjusting button is not relatively movable with respect to said radially outwardly extending flange at said first location.

* * * * *

UNITED STATES PATENT AND TRADEMARK OFFICE
CERTIFICATE OF CORRECTION

PATENT NO.  : 5,303,876
DATED       : April 19, 1994
INVENTOR(S) : Hiroki Suzuki, et al It is certified that error appears in the above-indentified patent and that said Letters Patent is hereby corrected as shown below:

The title page, should be deleted to be replaced with the attached title page.

Figure 2:
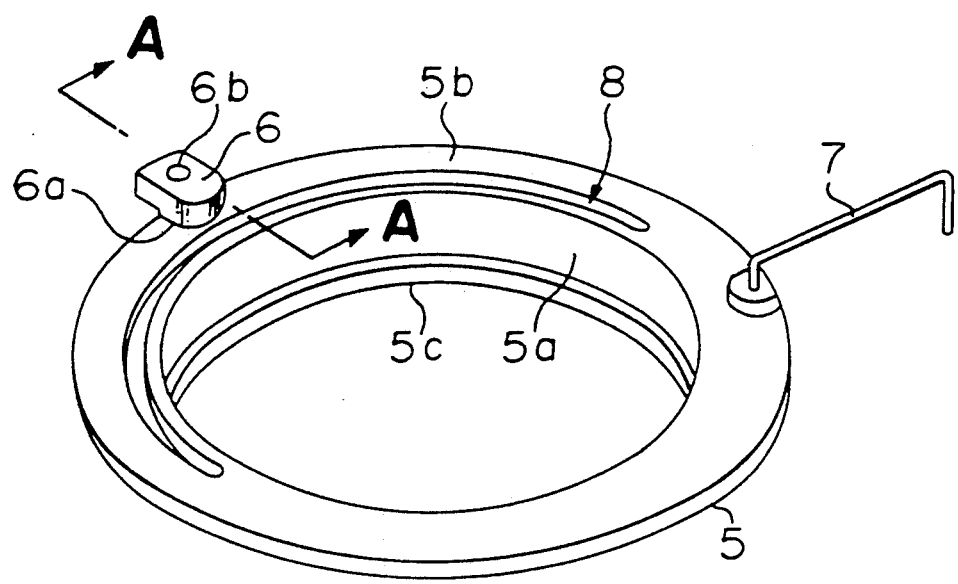
FIG. 2 is a perspective view from an upper direction of an embodiment of an interlocking plate used for the present invention.
Figure 3:
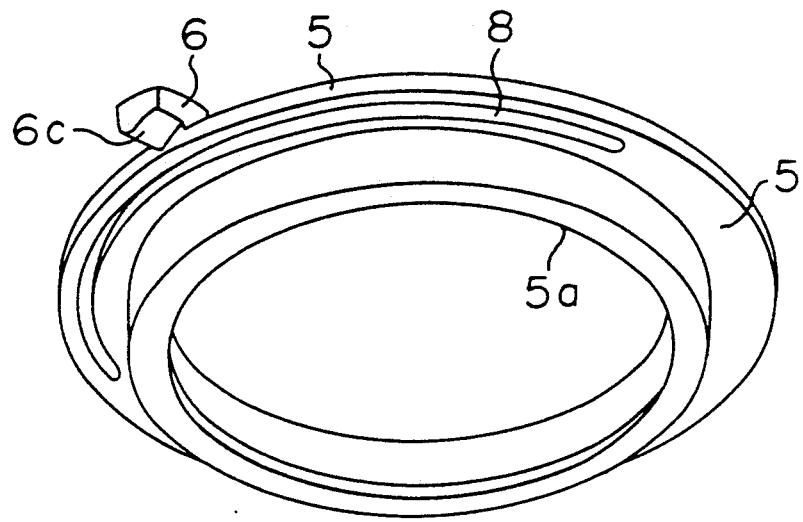
FIG. 3 is a perspective view from a lower direction of the interlocking plate show in FIG. 2.
Figure 4:
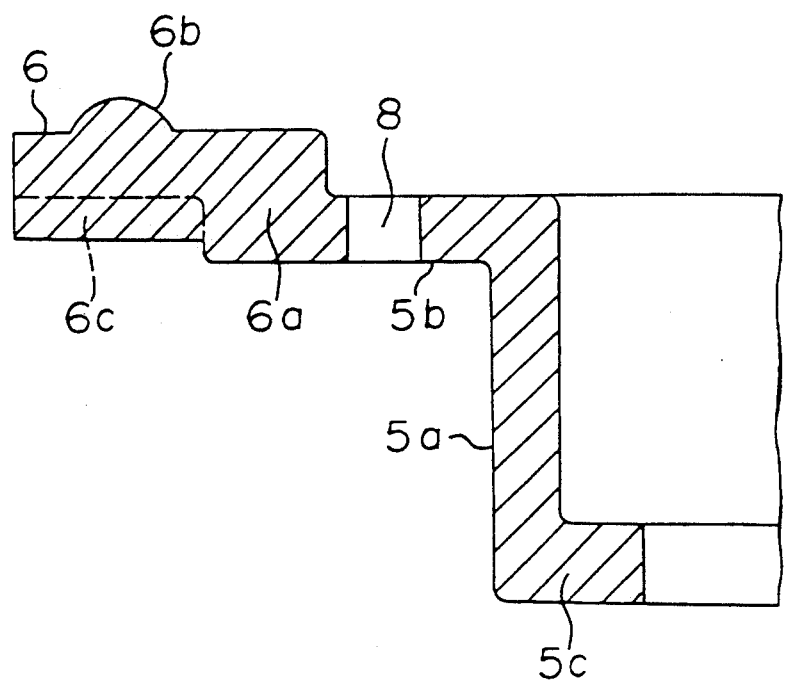
FIG. 4 is an enlarged cross-sectional view taken along a line A-A in FIG. 2.

The drawing sheet, consisting of Figs. 1 and 2, should be deleted to be replaced with the drawing sheet, consisting of Figs. 1 and 2, as shown on the attached page.

Signed and Sealed this

Sixth Day of September, 1994

Attest:

BRUCE LEHMAN

*Attesting Officer*    *Commissioner of Patents and Trademarks*

United States Patent

Suzuki et al.

[11] Patent Number: 5,303,876
[45] Date of Patent: Apr. 19, 1994

[54] MAGNETIC TAPE CASSETTE

[75] Inventors: Hiroki Suzuki; Takateru Sato, both of Saku; Haruo Shiba, Komoro, all of Japan

[73] Assignee: TDK Corporation, Tokyo, Japan

[21] Appl. No.: 929,020

[22] Filed: Aug. 13, 1992

[30] Foreign Application Priority Data

Aug. 20, 1991 [JP] Japan .................. 3-73002[U]
Sep. 4, 1991 [JP] Japan .................. 3-78723[U]

[51] Int. Cl.⁵ ........................................ G11B 23/087
[52] U.S. Cl. .............................................. 242/199
[58] Field of Search ........... 242/188, 192, 197, 199, 242/186, 189; 360/132

[56] References Cited

U.S. PATENT DOCUMENTS

| 4,405,096 | 9/1983 | Pössl .................. 242/199 |
| 4,458,857 | 7/1984 | Moore et al. ......... 242/197 |
| 4,466,584 | 8/1984 | Chevalier et al. ..... 242/199 |
| 4,615,682 | 10/1986 | Salvo .............. 242/197 X |
| 4,660,784 | 4/1987 | Sumida et al. ....... 360/132 X |
| 4,763,784 | 8/1988 | Newell ............. 242/199 X |
| 4,802,048 | 1/1989 | Perkins et al. ....... 242/199 X |

FOREIGN PATENT DOCUMENTS

4-11273 3/1992 Japan.
4-31482 3/1992 Japan.

*Primary Examiner*—Daniel P. Stodola
*Assistant Examiner*—John P. Darling
*Attorney, Agent, or Firm*—Oblon, Spivak, McClelland, Maier & Neustadt

[57] ABSTRACT

A magnetic tape cassette comprises a cassette casing, a pair of reels, on which a magnetic tape is wound, which are received in the cassette casing in a rotatable manner, and an interlocking plate for stopping the feeding of the magnetic tape, mounted on either one of said pair of reels, which is provided with an adjusting button and a control pin, wherein the interlocking plate and the adjusting button are formed integrally of a flexible material.

13 Claims, 5 Drawing Sheets